US012790662B2

(12) United States Patent
Gültekin et al.

(10) Patent No.: US 12,790,662 B2
(45) Date of Patent: Nov. 10, 2026

(54) METHOD FOR THE RECOVERY OF ALUMINIUM FROM ALUMINIUM SCRAP, AND MULTICHAMBER MELTING FURNACE

(71) Applicant: LOI THERMPROCESS GMBH, Duisburg (DE)

(72) Inventors: Rukiye Gültekin, Düsseldorf (DE); Dominikus Schröder, Halver (DE)

( * ) Notice: Subject to any disclaimer, the term of this patent is extended or adjusted under 35 U.S.C. 154(b) by 474 days.

(21) Appl. No.: 18/255,017

(22) PCT Filed: Nov. 26, 2021

(86) PCT No.: PCT/EP2021/083252
§ 371 (c)(1),
(2) Date: May 30, 2023

(87) PCT Pub. No.: WO2022/117466
PCT Pub. Date: Jun. 9, 2022

(65) Prior Publication Data

US 2024/0011122 A1 Jan. 11, 2024

(30) Foreign Application Priority Data

Dec. 3, 2020 (DE) ..................... 10 2020 132 240.2

(51) Int. Cl.
*C22B 21/00* (2006.01)
*C22B 1/00* (2006.01)
(Continued)

(52) U.S. Cl.
CPC .......... *C22B 21/0092* (2013.01); *C22B 1/005* (2013.01); *C22B 7/003* (2013.01);
(Continued)

(58) Field of Classification Search
CPC ..... C22B 21/0092; C22B 1/005; C22B 7/003; C22B 21/0007; C22B 21/0069;
(Continued)

(56) References Cited

U.S. PATENT DOCUMENTS 2,264,740 A * 12/1941 Brown ...................... F27B 3/18 266/236
4,010,935 A * 3/1977 Stephens ................... F27B 3/28 266/155
(Continued)

FOREIGN PATENT DOCUMENTS

EP 0780481 A1 6/1997
EP 0787810 A1 8/1997
(Continued)

OTHER PUBLICATIONS

International application No. PCT/EP2021/083252 International Search Report dated Mar. 9, 2022 with translation.
(Continued)

*Primary Examiner* — Jessee R Roe
*Assistant Examiner* — Michael Aboagye
(74) *Attorney, Agent, or Firm* — Anglehart et al.

(57) ABSTRACT

Aluminum scrap having organic adhesions is processed to recover aluminum. A hearth of scrap chamber of a multi-chamber melting furnace is batchwise loaded with aluminum scrap where it is heated in low oxygen to convert the organic adhesions on the aluminum scrap into a pyrolysis gas. In a second pretreatment phase, the scrap chamber is heated to the auto-ignition temperature of the pyrolysis gas, wherein at least one air flow is provided in the scrap chamber to produce an ignitable substoichiometric pyrolysis gas/combustion air mixture which is reacted in the scrap chamber in a combustion process. The atmosphere from the scrap chamber is transferred to a post-combustion. A corresponding multi-chamber melting furnace is also provided.

24 Claims, 5 Drawing Sheets

(51) Int. Cl.
*C22B 7/00* (2006.01)
*F23N 1/02* (2006.01)
*F27B 3/04* (2006.01)
*F27D 17/00* (2025.01)
*F27D 17/10* (2025.01)
*F27D 19/00* (2006.01)

(52) U.S. Cl.
CPC .......... *C22B 21/0007* (2013.01); *F23N 1/022* (2013.01); *F27B 3/045* (2013.01); *F27D 17/10* (2025.01); *F27D 19/00* (2013.01); *F27D 17/102* (2025.01); *F27D 2019/0012* (2013.01)

(58) Field of Classification Search
CPC .. F23N 1/022; F27B 3/045; F27B 3/20; F27B 3/22; F27D 17/10; F27D 19/00; F27D 17/102; F27D 2019/0012; F27D 2019/0006; Y02P 10/20
USPC ...... 266/44, 78, 79, 242, 229, 901, 144, 200
See application file for complete search history.

(56) References Cited

U.S. PATENT DOCUMENTS 4,060,408 A * 11/1977 Kuhn .................. C22B 21/0007 75/687
4,581,063 A * 4/1986 Oyabu .................. F27D 3/0025 266/200
5,673,900 A * 10/1997 Riley ...................... C22B 7/003 266/144
5,846,480 A * 12/1998 Cibaldi ................... C22B 7/003 266/200
6,227,847 B1 * 5/2001 Gillespie ................. F23G 7/066 432/106
2001/0028136 A1 10/2001 Hertwich

FOREIGN PATENT DOCUMENTS

EP 1146304 B1 9/2005
WO 92/01074 A1 1/1992

OTHER PUBLICATIONS

International application No. PCT/EP2021/083252 Written Opinion of the International Searching Authority dated Mar. 9, 2022.
Corresponding German patent application No. 10 2020 132 240.2 examination report dated Apr. 16, 2021 (Translations by Google are provided).
Benjamin Jaroni, et al., The Influence of Pyrolythic Reactions on the Aluminum Dross Formation during the Twin Chamber Remelting Process. 13th International Conferenceon Aluminum Alloys,Proceedings, 2012. ICAA13 Pittsburgh pp. 1327-1336.
Rukiey Gultekin, et al., Production enhancement in aluminium recycling via improved thermal pre-treatment. Aluminium Oct. 2018, Show Edition. pp. 64-67.

* cited by examiner

METHOD FOR THE RECOVERY OF ALUMINIUM FROM ALUMINIUM SCRAP, AND MULTICHAMBER MELTING FURNACE

BRIEF SUMMARY

The invention relates to a method for recovering aluminum from aluminum scrap which has organic adhesions, in a multi-chamber melting furnace, having a scrap chamber which is set up to receive melt, the scrap chamber having a hearth which can be loaded with the aluminum scrap in batches, which is located above the level (N) of the melt and wherein a loading door is arranged in the wall of the scrap chamber, and with at least one heating chamber which is arranged to receive melt and which has at least one combustion device, at least with the following method steps:

batchwise loading of the hearth (7) of the scrap chamber (2) with aluminum scrap (6), thermal pretreatment of the aluminum scrap (6) in the scrap chamber (2) during a first pretreatment phase at a predetermined first temperature and in an atmosphere which is free of oxygen, in order to convert the organic adhesions on the aluminum scrap into a pyrolysis gas.

Further, the invention relates to a multi-chamber melting furnace for recovering aluminum from aluminum scrap having organic adhesions, comprising:

a scrap chamber, which is arranged to receive melt, wherein the scrap chamber has a hearth which can be loaded with the aluminum scrap in batches and which is located above the level (N) of the melt and wherein a loading door is arranged in the wall of the scrap chamber, wherein the scrap chamber is arranged for thermal pretreatment of the aluminum scrap and wherein during a first pretreatment phase, at a predetermined first temperature in an atmosphere which is free of oxygen, the organic adhesions on the aluminum scrap can be converted into a pyrolysis gas, and at least one heating chamber which is set up to receive melt and which has at least one combustion device.

BRIEF DESCRIPTION OF THE SEVERAL VIEWS OF THE DRAWING(S)

DETAILED DESCRIPTION

Figure 1:
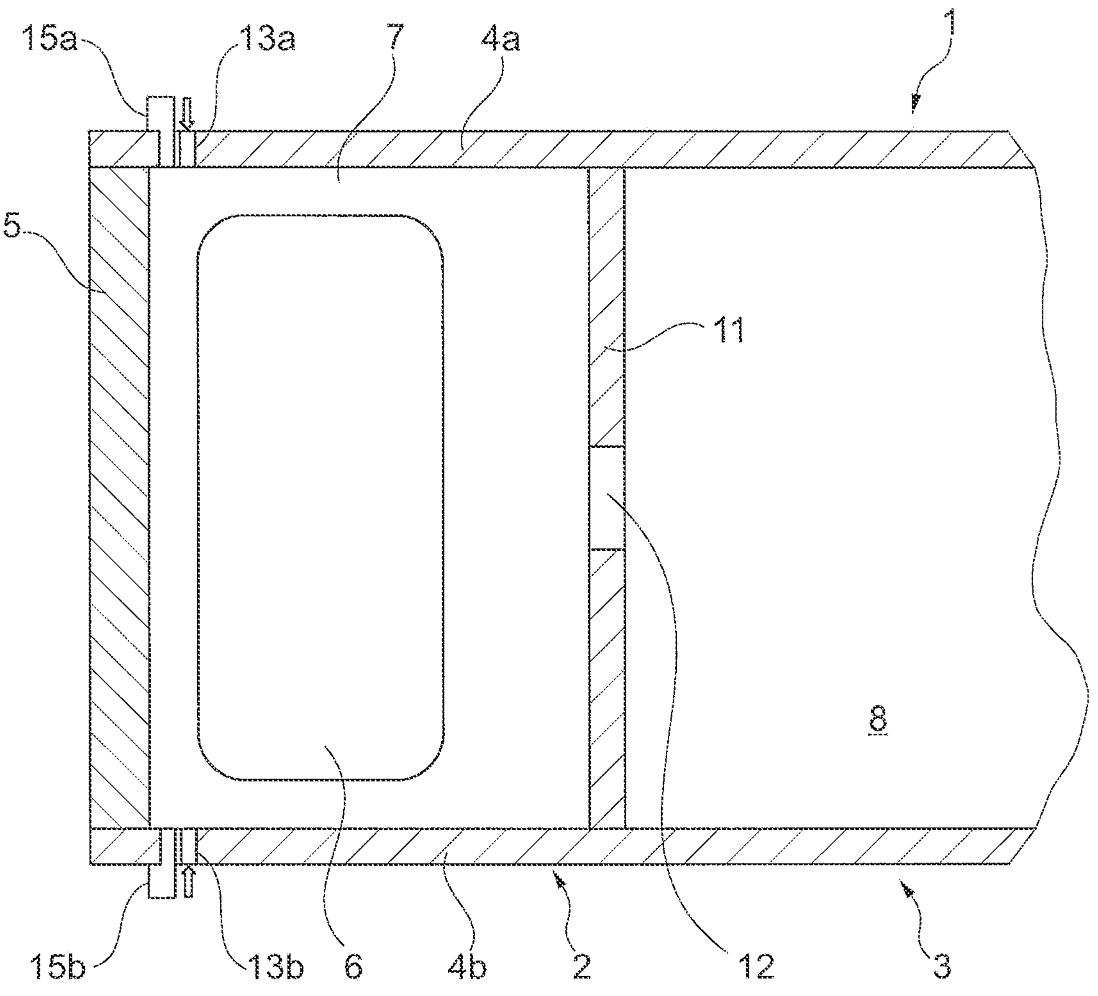
FIG. 1 shows a multi-chamber melting furnace for recovering aluminum from aluminum scrap in a sectional view from above.

A multi-chamber melting furnace is understood to be a melting furnace system with several chambers separated from each other. The individual chambers can be spatially separated from each other or formed in a single furnace housing or a common wall. A two-chamber furnace known per se has two chambers, namely a scrap chamber in which aluminum scrap is introduced in batches for thermal pretreatment and a heating chamber for heating the melt located in the heating chamber.

In the heating chamber, the heat required for melting in both chambers is provided by means of at least one combustion device. Usually several burners, in particular gas burners, are used. At least part of the heat required for pretreatment is introduced into the scrap chamber by a recirculating stream of melt and atmosphere exchange from the heating chamber.

The aluminum scrap can be, for example, can scrap. Can scrap is either used aluminum beverage cans or return material from industrial manufacturing. In an embodiment, the aluminum scrap can also be any other scrap that is to be melted down, e.g. in the form of shredder material, profiles or other return scrap.

Aluminum scrap is often contaminated or has some organic contamination on the surface. The aluminum scrap may be contaminated with oils, greases, paints, coatings or other organic contaminants. The adhesions, e.g. the coatings of beverage cans, usually consist of long-chain hydrocarbon compounds.

It is known from practice to subject aluminum scrap to thermal pretreatment in order to remove the adhesions as far as possible. Due to its practical feasibility, thermal pretreatment in the form of pyrolysis has become established.

During a first pretreatment phase, at a predetermined first temperature in an atmosphere which is free of oxygen, i.e. whose oxygen content is so low that no free oxygen is available for the oxidation of aluminum, the organic adhesions are pyrolyzed to a large extent.

After pretreatment, however, the scrap still has organic adhesions on the surface, namely less volatile adhesions, such as in the form of elemental carbon. If these adhesions are introduced into the melting process in the heating chamber, the carbon reacts with the aluminum to aluminum carbide. Residues of non-pyrolyzed adhesions react with the melt and lead to dross generation. This leads to a loss of metal.

In other words, interactions between organic attachments and melt lead to high metal losses.

Accordingly, the object of the invention is to provide a remedy for this situation and to provide a means for avoiding dross generation during the recovery of aluminum from aluminum scrap in a multi-chamber melting furnace and for increasing the metal yield. This task is solved by a method with the method steps and a multi-chamber melting furnace.

The method according to the invention comprises at least the following steps:

batchwise loading of the hearth of the scrap chamber with aluminum scrap, thermal pretreatment of the aluminum scrap in the scrap chamber during a first pretreatment phase at a predetermined first temperature and in an atmosphere free of oxygen in order to convert the organic adhesions on the aluminum scrap into a pyrolysis gas, thermal pretreatment of the aluminum scrap in the scrap chamber during a second pretreatment phase at a predetermined second temperature, wherein the scrap chamber is heated to the auto-ignition temperature of the pyrolysis gas, wherein at least one air flow is provided in the scrap chamber to produce an ignitable substoichiometric pyrolysis gas/combustion air mixture which is reacted in the scrap chamber in a combustion process, and transferring the atmosphere from the scrap chamber to post-combustion.

The method steps are carried out in the sequence shown. However, individual or several of the method steps can also be carried out simultaneously, consecutively and/or at least partially in parallel.

The batchwise loading of the hearth of the scrap chamber with aluminum scrap is preferably carried out by means of a special charging machine, in particular by means of a charging machine sealed off from the melting furnace, so that the introduction of oxygen into the scrap chamber is largely avoided during loading. If oxygen should be introduced into the scrap chamber during loading, it is eliminated during, preferably at the end of, the method step of loading, preferably by means of a short combustion step.

In other words, the following additional method step is carried out before the second pretreatment phase:

Burning of the oxygen introduced into the scrap chamber during loading.

Experience has shown that combustion of between approx. 30 seconds and two minutes is sufficient to largely eliminate oxygen introduced into the scrap chamber during loading. After this, the first pretreatment phase begins.

During a first pretreatment phase at a predetermined first temperature, the organic adhesions on the aluminum scrap are converted into a pyrolysis gas by means of pyrolysis.

The first pretreatment phase takes place at a first temperature, which is up to about 550° C., in an atmosphere that does not contain free oxygen, i.e. whose oxygen content is so low that oxidation of the aluminum scrap during pretreatment is avoided.

Depending on the alloy, the melting temperature of aluminum is between 60° and 650° C. and thus above the pyrolysis temperature, which is a maximum of 550° C.

During the second pretreatment phase, the scrap chamber is heated at least to the auto-ignition temperature of the pyrolysis gas, which is approx. 750° C. The predetermined second temperature is about 850° C. Preferably, the second temperature is between 750° C. and 900° C. The air flow introduced into the scrap chamber provides the oxygen necessary for a substoichiometric combustion reaction. The pyrolysis gas/air mixture is sub-stoichiometrically reacted to avoid oxidation of the aluminum scrap. The reaction largely eliminates those hydrocarbons that would react with the melt in the form of adhesions on the aluminum scrap and lead to dross generation.

After the second pre-treatment phase, the aluminum scrap is pushed into the liquid melt surrounding the hearth and melted.

The method according to the invention has the advantage of avoiding metal loss in the melt product.

Advantageous embodiments of the method and of the multi-chamber melting furnace are provided herein. The features disclosed herein can be combined with one another in any technologically sensible manner and define further embodiments of the invention.

Preferably, during the second pretreatment phase, the air flow is provided in such a way that a pyrolysis gas/combustion air mixture with an air number (A) in the range of 0.3 to 0.6, preferably 0.5, is achieved. A control/regulation unit (14) is used for this purpose.

Preferably, the melt recirculates between the heating chamber and the scrap chamber to heat the melt in the scrap chamber.

By recirculating the melt between the heating chamber and the scrap chamber, the melt, which is heated in the heating chamber by means of the combustion device, is introduced into the scrap chamber, where it serves to heat the scrap pushed into the melt after the second pretreatment phase until it is melted down.

For recirculation, a circular line could be used between the heating chamber and the scrap chamber. Advantageously, the melt is conveyed from the heating chamber to the melting chamber by means of a pipe in which a pump is arranged. Alternatively, a stirrer can provide for the circulation of the melt between the chambers, if suitable openings are provided in the intermediate wall in the area of the melt.

An advantageous embodiment is characterized in that during the second pretreatment phase, the following method step is additionally carried out:

when the temperature in the scrap chamber is lower than the auto-ignition temperature of the pyrolysis gas, generating at least one flame in the scrap chamber, by means of a burner to which fuel and combustion air are supplied.

The burner is used to cause ignition of the air/pyrolysis gas mixture when the temperature in the scrap chamber is lower than the auto-ignition temperature of the pyrolysis gas. When the self-ignition temperature of the pyrolysis gas in the scrap chamber is reached, the burner is switched off because the reaction between the oxygen from the air stream and the pyrolysis gas takes place without an ignition source.

An essential further embodiment of the method according to the invention is characterized in that the atmosphere from the scrap chamber is transferred to the heating chamber for post-combustion and that preferably the combustion device is operated with excess air. Consequently, the air ratio (λ), which relates the air mass actually available to the air mass theoretically required for complete combustion, is greater than 1.0. In other words, the combustion device is operated overstoichiometrically to provide combustion air for the combustible portions of the atmosphere from the scrap chamber. Thus, the combustion air for post-combustion is supplied to the atmosphere in a simple manner by means of the combustion device.

The aluminum scrap has varying amounts of organic adhesions. In the case of large amounts of adhesions, there is a risk of overloading the post combustion in the heating chamber. In the method according to the invention, overloading of the post-combustion in the heating chamber is avoided because some of the hydrocarbons are already burned during the second pretreatment phase in the scrap chamber. It is further advantageous that the combustion reaction during the second pretreatment phase causes heating, in particular uniform heating, of the batch of aluminum scrap.

Preferably, by means of a sensor in an exhaust gas outlet of the heating chamber, a characteristic value for the mixing ratio respectively the air number of the gas/air mixture in the heating chamber is measured and, depending on the deviation of the measured value of the characteristic value from a setpoint value, a signal for supplying more or less fuel and/or combustion air to the combustion device is generated, preferably using a control/regulation unit.

Conclusions about the combustion process can be drawn from the characteristic value. If the proportion of hydrocarbons in the atmosphere supplied to the heating chamber for post-combustion should be extremely high, the fuel supply to the combustion device could also be completely interrupted so that only combustion air flows out of the combustion device.

Within the scope of the invention, an actuating variable for providing and/or stopping the provision of the air flow in the scrap chamber could be generated from the measured characteristic value, preferably by means of the control/regulation unit.

A particularly advantageous further embodiment of the invention is that an actuating variable for providing and/or stopping the provision of the air flow in the scrap chamber and/or for generating the flame in the scrap chamber is derived from the measured characteristic value or from the signal as a function of the deviation of the measured characteristic value from the setpoint value, preferably by means of the control/regulation unit.

Preferably, the oxygen content of the exhaust gas is measured by means of the sensor. Alternatively, other parameters for the mixing ratio of the gas/air mixture in the heating chamber could also be measured.

The method according to the invention is further characterized in that in the second pretreatment phase the air flow is provided by directing the air flow between the loading door and the aluminum scrap into the scrap chamber or by directing one air flow each between the loading door and the aluminum scrap into the scrap chamber from opposite walls of the scrap chamber.

The area between the loading door and the aluminum scrap batch is the coldest area in the scrap chamber. Due to the reaction of the pyrolysis gas with the oxygen from the air flow directed into this area, the temperature in this area is raised so that the adhesions still on the aluminum scrap can be uniformly converted to the gaseous state and burned.

Preferably, the flame is generated adjacent to the air stream provided in the scrap chamber, wherein preferably the distance between the flame and the air stream is selected such that the flame heats the air stream, and wherein preferably the flame and the air stream are directed into the scrap chamber in the same manner. In other words, the flame and the air stream are directed into the scrap chamber with the same direction.

In the context of the invention, the atmosphere inside the scrap chamber can be circulated by means of a circulation channel connected to the scrap chamber with an inlet opening and an outlet opening, preferably parallel to the partition wall in the scrap chamber, preferably by means of a fan. Preferably, the air flow and/or the flame are directed into the scrap chamber in the flow of the circulated atmosphere in the outlet opening between the loading door and the aluminum scrap.

A particularly advantageous further embodiment of the invention is that the air flow in the scrap chamber is provided by means of the burner, which is operated with excess air when the temperature in the scrap chamber is lower than the auto-ignition temperature of the pyrolysis gas and/or its fuel supply is interrupted and its combustion air supply is thus reduced, that a substoichiometric pyrolysis gas/combustion air mixture is generated in the scrap chamber when the temperature in the scrap chamber has reached or exceeds the auto-ignition temperature of the pyrolysis gas.

When the temperature in the scrap chamber is lower than the auto-ignition temperature of the pyrolysis gas, a flame is generated in the scrap chamber by means of the fuel supply to the burner. With the excess air, the combustion air is provided to generate an ignitable substoichiometric pyrolysis gas/combustion air mixture in the scrap chamber.

When the temperature in the scrap chamber reaches or exceeds the auto-ignition temperature of the pyrolysis gas, a flame is no longer required for ignition purposes. The air flow that must be provided to generate an ignitable substoichiometric pyrolysis gas/combustion air mixture in the scrap chamber is supplied by the combustion air supply to the burner and enters the scrap chamber through the burner.

The invention further includes a multi-chamber melting furnace for recovering aluminum from aluminum scrap having organic adhesions, comprising:

a scrap chamber adapted to receive melt, said scrap chamber having a hearth loadable with the aluminum scrap in batches, said hearth being located above the level of the melt, and wherein a loading door is disposed in the wall of said scrap chamber, wherein the scrap chamber is arranged for thermal pretreatment of the aluminum scrap and wherein during a first pretreatment phase, at a predetermined first temperature in an atmosphere which is free of oxygen, the organic adhesions on the aluminum scrap can be converted into a pyrolysis gas, at least one heating chamber adapted to receive melt and having at least one combustion device, at least one air inlet in the wall of the scrap chamber for providing at least one air flow in the scrap chamber during a second pretreatment phase at a predetermined second temperature, the scrap chamber being heatable to the auto-ignition temperature of the pyrolysis gas, a control/regulating unit arranged to provide the air flow in the scrap chamber such that an ignitable substoichiometric pyrolysis gas/combustion air mixture is formed in the scrap chamber, which mixture can be reacted in the scrap chamber in a combustion process, and an atmosphere outlet in the wall of the scrap chamber for discharging the atmosphere from the scrap chamber to a post combustion.

During the first pretreatment phase, pyrolysis takes place at the specified first temperature. This is a conversion process in which organic compounds are split in the absence of oxygen (air number $\lambda$ essentially=0). By means of oxygen exclusion, oxidation of the aluminum scrap is prevented.

The atmosphere is free of oxygen. This is understood to mean that the oxygen content is extremely low, so that pyrolysis and not oxidation or combustion takes place during the first pretreatment phase.

During the second pretreatment phase, the scrap chamber is heated at least to the auto-ignition temperature of the pyrolysis gas, which is approx. 750° C. The predetermined second temperature is about 850° C. Preferably, the second temperature is between 750° C. and 900° C. The air flow introduced into the scrap chamber through the air inlet provides the oxygen necessary for a substoichiometric combustion reaction. The pyrolysis gas/air mixture is sub-stoichiometrically reacted to avoid oxidation of the aluminum scrap. The reaction largely eliminates those hydrocarbons in the form of adhesions on the aluminum scrap that would react with the melt and lead to dross formation when, after pretreatment, the aluminum scrap is pushed into the liquid melt surrounding the hearth and melted.

According to a further advantageous feature of the invention, the multi-chamber melting furnace is characterized in that a partition wall is located between the scrap chamber and heating chamber, and in that the partition wall has at least one opening for recirculating the melt between the heating chamber and the scrap chamber in order to heat the melt in the scrap chamber. The scrap chamber and the heating chamber are arranged in horizontal direction one behind the other, side by side or in L-shape to each other and are separated from each other by the partition wall.

Preferably, the atmosphere outlet is formed as a connecting line between the scrap chamber and the heating chamber to transfer the atmosphere from the scrap chamber to the heating chamber for post-combustion, and wherein preferably the combustion device is operable with excess air to supply the combustion air to the atmosphere for post-combustion by means of the combustion device. The connecting line between the scrap chamber and the heating chamber preferably has a blower/fan.

According to a further feature of the invention, the scrap chamber has at least one burner to which fuel is supplied by means of a fuel supply and to which combustion air is supplied by means of a combustion air supply, and wherein the burner is set up to initiate the combustion process of the pyrolysis gas/air mixture by means of a flame when the temperature in the scrap chamber is lower than the auto-ignition temperature of the pyrolysis gas. This allows the combustion reaction to be initiated at the earliest possible stage, thus accelerating the process.

According to another advantageous feature of the invention, the multi-chamber melting furnace is characterized in that the air inlet is designed as an air lance and/or that the burner is arranged next to the air inlet, that preferably the distance between the air inlet and the burner is such that the flame of the burner heats the air flow from the air inlet, and that preferably the burner and the air inlet are directed in the same manner into the scrap chamber between the loading door and the aluminum scrap.

In other words, the flame from the burner and the air flow from the air inlet in the form of an air lance are directed in the same direction into the scrap chamber.

Preferably, starting from opposite walls of the scrap chamber, one air lance each is directed into the scrap chamber between the loading door and the aluminum scrap. This design has proven to be particularly effective. The arrangement should be chosen so that the flame and the air flow are not directed at the scrap but next to it.

A particularly advantageous further embodiment of the invention is that the burner forms the air inlet and that the control/regulation unit is set up to operate the burner with excess air when the temperature in the scrap chamber is lower than the self-ignition temperature of the pyrolysis gas and/or to interrupt the fuel supply to the burner and to reduce its combustion air supply when the temperature in the scrap chamber has reached or exceeds the self-ignition temperature of the pyrolysis gas. For this purpose, the fuel supply and the combustion air supply have corresponding actuators.

When the temperature in the scrap chamber is lower than the auto-ignition temperature of the pyrolysis gas, a flame is generated in the scrap chamber by means of the burner. The burner is operated with excess air to provide with the excess air the air flow needed in the scrap chamber to produce an ignitable substoichiometric pyrolysis gas/combustion air mixture.

When the temperature in the scrap chamber has reached the auto-ignition temperature of the pyrolysis gas, no flame is required for ignition. Consequently, the fuel supply to the burner is interrupted. Because no more fuel is supplied to the burner, the combustion air supply can be reduced accordingly, so that only enough combustion air is supplied to produce an ignitable substoichiometric pyrolysis gas/combustion air mixture in the scrap chamber.

A preferred embodiment is characterized in that at least one circulation channel is connected to the scrap chamber for circulating the atmosphere inside the scrap chamber, preferably by means of a fan, that the inlet opening of the circulation channel is located in the wall of the scrap chamber adjacent to the partition wall and the outlet opening of the circulation channel is preferably located in the wall of the scrap chamber between the loading door and the hearth, and that preferably the air inlet and/or the burner is/are arranged inside the outlet opening.

Preferably, the air inlet designed as an air lance is such that the air exit velocity is relatively high, so as to obtain a uniform distribution of air in the area between the loading door and the batch with aluminum scrap. The exit velocity from the burner is also high so as to obtain a uniform temperature distribution between the door and the batch of scrap. Preferably, the exit velocity of the burner is between 60 m/s and 130 m/s and/or the exit velocity of the air stream from the air inlet is between 30 m/s and 60 m/s.

The invention, further advantages and the technical environment are explained in more detail below by way of examples of preferred embodiments with reference to the accompanying drawings. The invention is not intended to be limited by the embodiments shown. It is also possible to combine partial aspects of the features explained in the figures with other features from other figures and/or the description.

Figure 2:
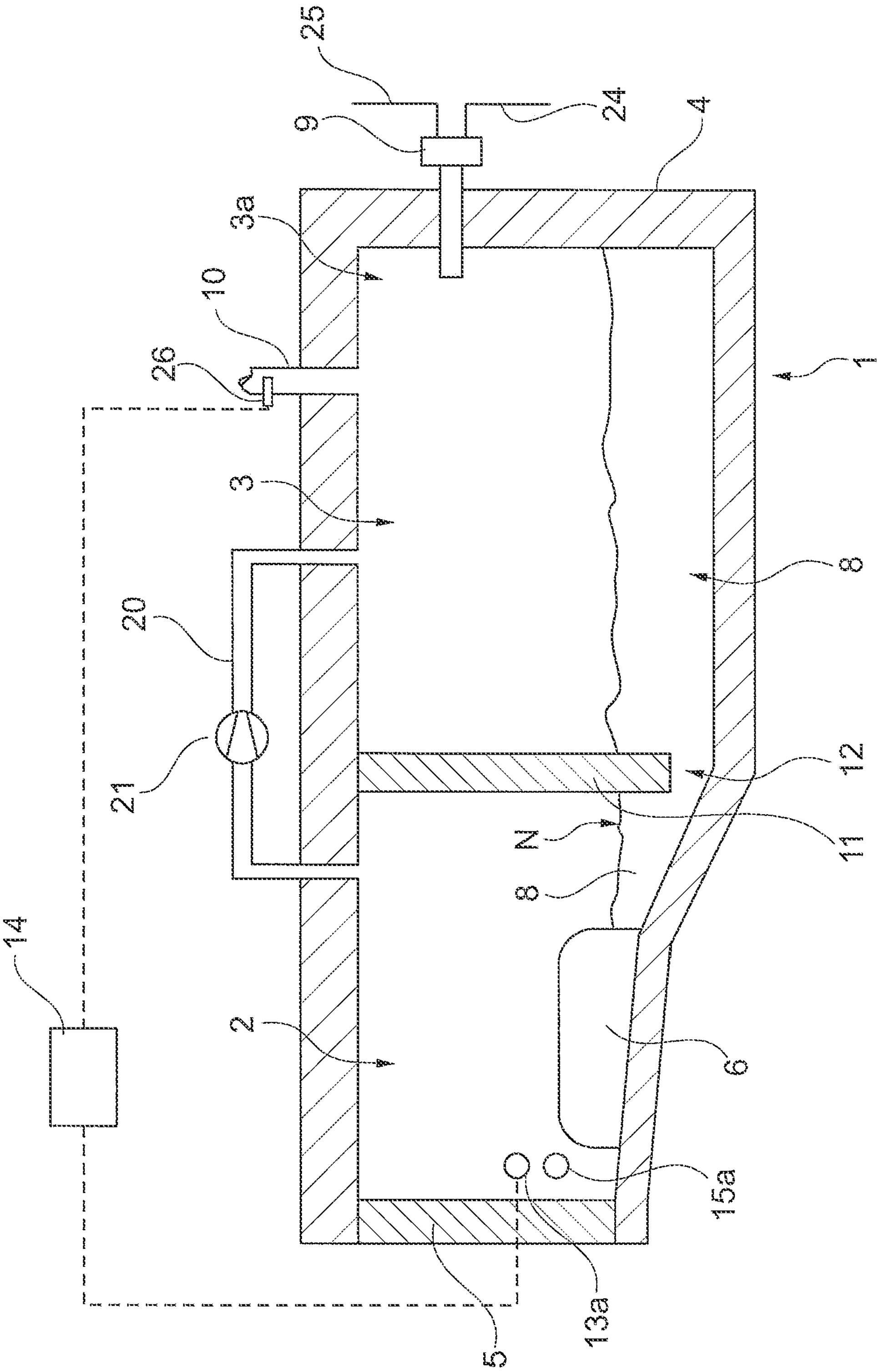
FIG. 2 shows the multi-chamber melting furnace from FIG. 1 in a lateral sectional view.

In all figures, identical components have identical reference numerals. FIG. 1 shows a sectional view, viewed from above, of a multi-chamber melting furnace 1 in the form of a two-chamber melting furnace for recovering aluminum from aluminum scrap which has organic adhesions. FIG. 2 shows a lateral sectional view and FIG. 3 a sectional view across the width of the multi-chamber melting furnace as seen from the front. Only those components of the multi-chamber melting furnace 1 which are essential to the invention are shown.

FIGS. 1 to 4 schematically show that the multi-chamber melting furnace 1 has a scrap chamber 2 and a heating chamber 3 with a wall 4 closed to the outside atmosphere with walls 4*a* and 4*b*.

The scrap chamber is set up for pretreatment of the aluminum scrap prior to melting. The scrap chamber 2 has a lockable loading door 5 at the front end, through which the scrap chamber 2 can be loaded with the aluminum scrap 6 in batches. The loading door 5 is horizontally movable and extends substantially over the entire width of the scrap chamber 2 or the multi-chamber melting furnace 1. A hearth 7, which is loaded with the aluminum scrap 6, is located in the scrap chamber 2. The aluminum scrap 6 is assembled as a batch. The hearth 7 is at least partially inclined and is adjacent to the liquid melt 8 under production conditions, wherein the hearth 7 is located above the level N of the melt 8. After pretreatment, the aluminum scrap is manually inserted into the liquid melt 8 and melted.

The heating chamber 3 extends, viewed from the loading door 5, behind the scrap chamber 2 over the entire width of the multi-chamber melting furnace 1. Liquid melt 8 is located in the heating chamber 3 and the heating chamber 3 has a combustion device 9 and an exhaust gas outlet 10. The combustion device 9 is designed as a gas burner directed into a heating zone 3*a* above the melt 8 in the melting chamber. Several combustion devices 9 in the form of gas burners are used, of which only one combustion device 9 is shown in FIG. 2.

The scrap chamber 2 and the heating chamber 3 are arranged one behind the other in the longitudinal direction and are separated from each other by means of a partition wall 11. The chambers can alternatively be arranged side by side or in an L-shape. It may be a suspended partition wall, for example. The partition wall 11 projects into the melt 8 under operating conditions. The partition wall 11 has below the level N or the surface of the melt 8 at least one opening 12 or channel for recirculating the melt 8 between the heating chamber 3 in the scrap chamber 2, in order to heat the melt in the scrap chamber 2 and thus to heat the scrap chamber 2.

The hearth 7 of the scrap chamber 2 is loaded with aluminum scrap in batches by means of an automatic charging machine not shown or a bucket wheel loader. A charging machine is used here which is sealed off from the melting furnace so that the entry of oxygen into the scrap chamber is largely prevented during loading. If the entry of oxygen into the scrap chamber during loading cannot be completely avoided, the oxygen is eliminated before the first pretreatment phase, preferably by means of a short combustion step. Experience has shown that a combustion of between 30 seconds and two minutes is sufficient to largely eliminate oxygen introduced into the scrap chamber during loading. The scrap chamber 2 is first heated to a predetermined first temperature preferably 550° C., by means of recirculation of the melt 8 from the heating chamber 3 into the scrap chamber. The heating could be accelerated by means of a suitable external heating.

No oxygen is supplied to the scrap chamber during the first pretreatment phase. The aluminum scrap is pretreated during the first pretreatment phase at the predetermined first temperature in a reducing atmosphere, i.e., an atmosphere substantially free of oxygen, to convert the organic adhesions on the aluminum scrap to a pyrolysis gas.

By "free of oxygen" is meant the absence of oxygen such that the air number $\lambda$ is essentially=0. A large part of the adhesions is transferred to the gas phase during this first pretreatment phase.

In each of the walls 4*a*, 4*b* of the scrap chamber 2 there is an air inlet 13*a*, 13*b* for providing an air flow L in the scrap chamber 2 in order to generate an ignitable pyrolysis gas/air mixture in the scrap chamber in a second pretreatment phase.

During the second pretreatment phase, the provision of the air flow L is controlled such that the air number of the pyrolysis gas/air mixture in the scrap chamber 2 is between 0.3 and 0.6, preferably 0.5.

In the two embodiments, starting from opposite walls 4*a* and 4*b* of the wall 4 of the scrap chamber 2, one air inlet 13*a*, 13*b* each in the form of an air lance is arranged such that the air flow L from each air inlet 13*a*, 13*b* is directed into the scrap chamber 2 between the loading door 5 and the aluminum scrap 6. This is intended to provide the airflow in the coldest area of the scrap chamber 3 near the aluminum scrap 6, while not directing the airflow directly at the aluminum scrap 6 to prevent melting of the metal and thus metal burnup. In addition, a uniformity of the temperature distribution in the melting chamber 3 is achieved.

Figure 3:
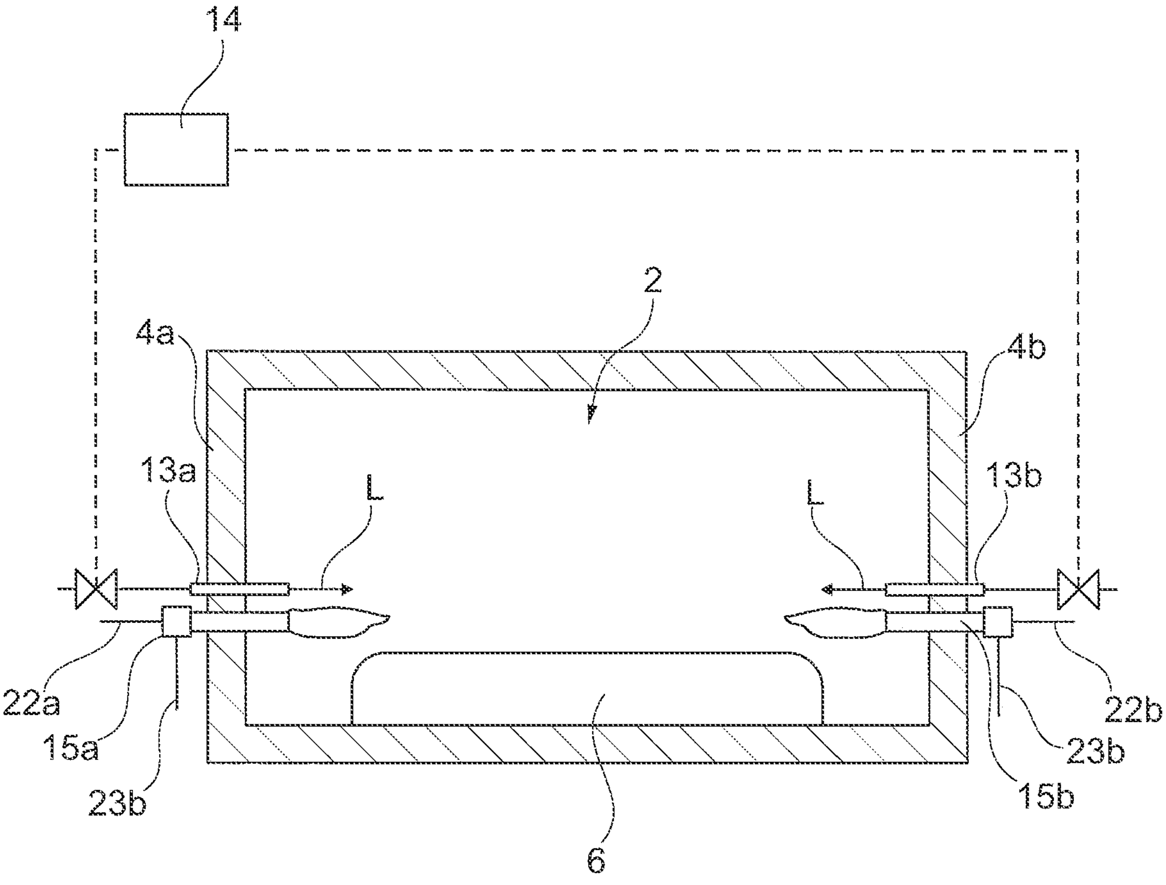
FIG. 3 shows a cross-sectional view from the front side of the multi-chamber melting furnace shown in FIG. 1.

During the second pretreatment phase, the scrap chamber 2 is heated to the auto-ignition temperature of the pyrolysis gas. In FIGS. 2 and 3, a control/regulation unit 14 is shown, which is arranged to control or regulate the provision of the air flow from the air inlets 13*a*, 13*b* in the scrap chamber 2 in such a way that an ignitable substoichiometric air/pyrolysis gas mixture is formed in the scrap chamber 2, which reacts in the scrap chamber 2 in a combustion process to form a combustion gas. The substoichiometric combustion ensures that no undesired oxidation of the aluminum scrap occurs.

The scrap chamber has a burner 15*a*, 15*b* on each of opposite walls 4*a*, 4*b* to initiate the combustion process during the second pretreatment phase when the temperature in the scrap chamber 2 is lower than the auto-ignition temperature of the pyrolysis gas. These burners are used to remove oxygen, which may be introduced into the scrap chamber during loading, from the scrap chamber during or immediately after loading by means of a combustion reaction before the first pretreatment phase begins. Only enough fuel is supplied to the scrap chamber by means of the burners until an ignitable mixture is formed with the oxygen present in the scrap chamber, which is brought to ignition.

Each burner 15*a*, 15*b* is assigned adjacent to an air inlet 13*a*, 13*b*. Preferably, the distance between each air inlet 13*a*, 13*b* and a burner 15*a*, 15*b* is so small that in each case the flame of the burner heats the adjacent air stream L from the air inlet. Adjacent burners and air outlets are directed in the same direction, preferably substantially parallel, to each other, into the scrap chamber 2. The exit velocity of the air streams L from the air inlets 13*a*, 13*b* is between 30 m/s and 60 m/s. This ensures that an optimum mixture of air and the combustible components of the pyrolysis gas is achieved. The exit velocity of the burners 15*a*, 15*b* is between 60 m/s and 130 m/s.

Figure 4:
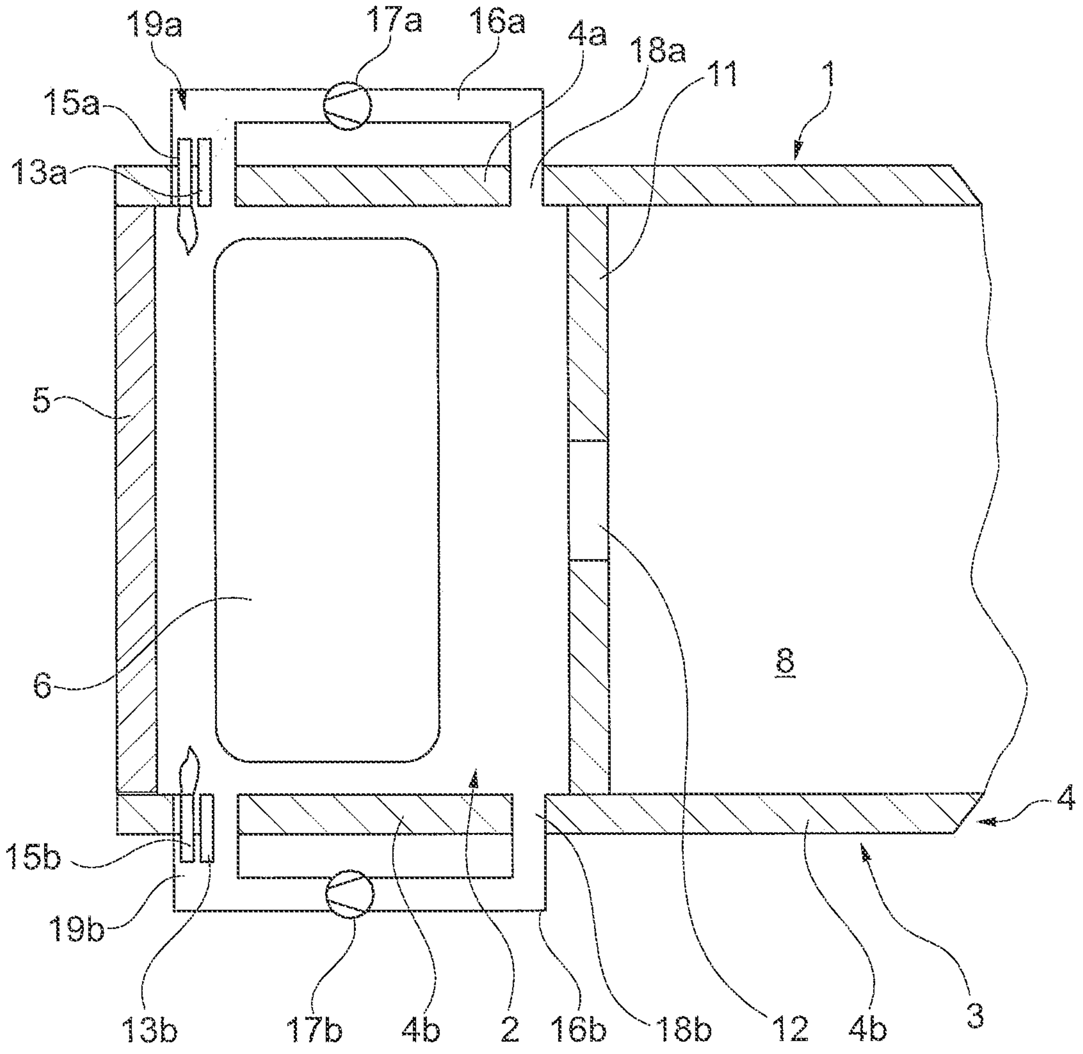
FIG. 4 shows a further embodiment of the multi-chamber melting furnace according to the invention in a sectional view from above.

In the embodiment according to FIG. 4, it is shown that the scrap chamber 2 has a circulation channel 16*a*, 16*b* on both sides, each with a fan 17*a*, 17*b*, for circulating the atmosphere inside the scrap chamber 2. The atmosphere is circulated in the longitudinal direction of the scrap chamber between the partition wall 11 and the front loading door. Each circulation channel 16*a*, 16*b* has an inlet opening 18*a*, 18*b* and an outlet opening 19*a*, 19*b* in each of the walls 4*a*, 4*b*. The inlet openings 18*a*, 18*b* are arranged adjacent to the partition wall 11. The outlet opening 19*a*, 19*b* are each located in the walls 4*a*, 4*b* between the front loading door and the hearth 7. The air inlet 13*a* and the burner 15*a* are arranged within the outlet opening 19*a* and the air inlet 13*b* and the burner 14*b* are arranged within the outlet opening 19*b*.

Figure 5:
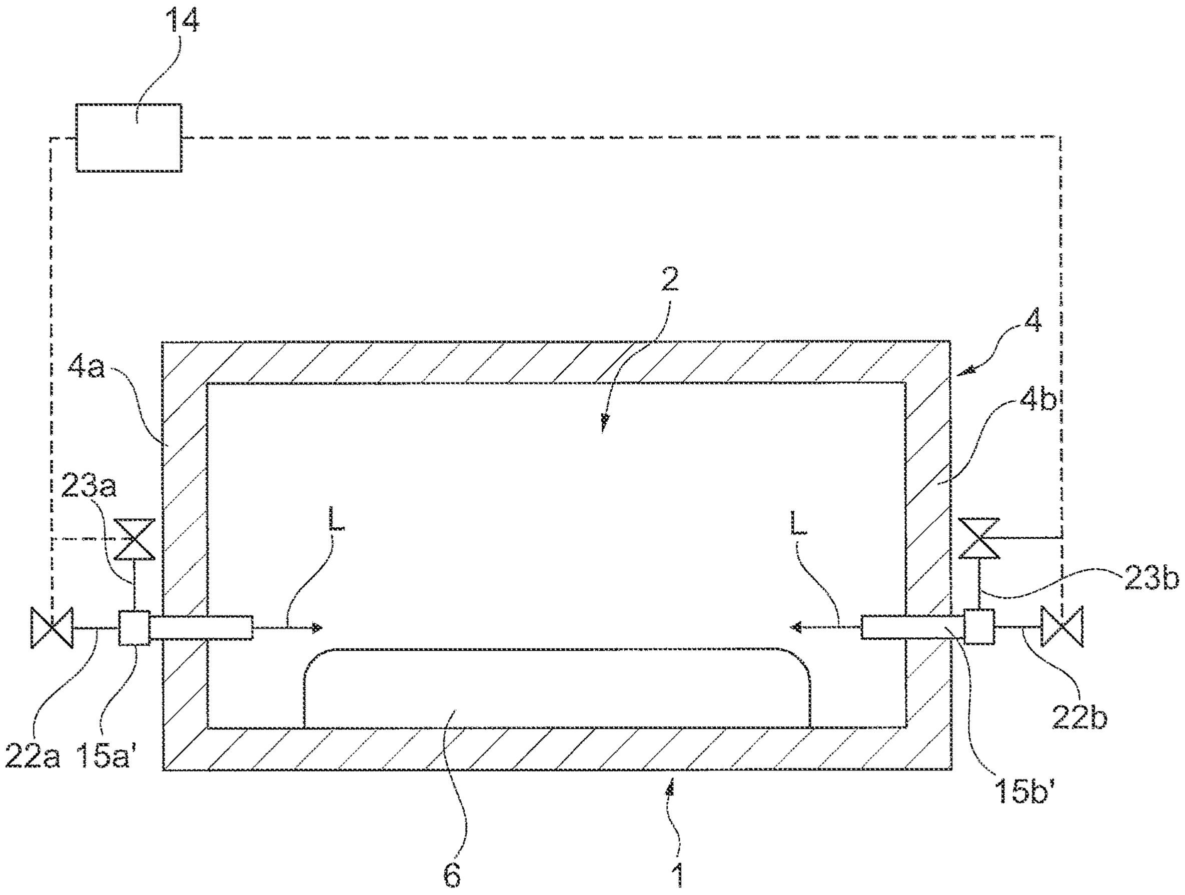
FIG. 5 shows a further embodiment of the multi-chamber melting furnace according to the invention in a lateral sectional view.

FIG. 5 shows an embodiment in which the burners 15*a*', 15*b*' also serve as air outlets. Each burner has a fuel supply 22*a*, 22*b* and an air supply 23*a*, 23*b*. Each burner 15*a*', 15*b*' is operated with excess air as long as the temperature in the scrap chamber 2 is lower than the self-ignition temperature of the pyrolysis gas. By means of the control/regulation unit 14, the fuel supply 22*a*, 22*b* to the burner is interrupted and its combustion air supply 23*a*, 23*b* is reduced in such a way that a substoichiometric pyrolysis gas/combustion air mixture is generated in the scrap chamber 2 when the temperature in the scrap chamber 2 has reached or exceeds the auto-ignition temperature of the pyrolysis gas. In this operating condition, shown in FIG. 5, only air flows from burners 15*a*', 15*b*'. Because air lances can be dispensed with, this embodiment is particularly simple in terms of design.

In FIG. 2 it is shown that a connecting line 20, which has a blower 21, is located between the scrap chamber 2 and the heating chamber 3 in order to supply the atmosphere from the scrap chamber 2 to the post-combustion in the heating chamber. The atmosphere has the exhaust gas from the combustion reaction during the second pretreatment phase and unburned pyrolysis gas. The thermal energy generated during post-combustion is used to heat the heating chamber.

The combustion device 9 is connected to a fuel line 24 and a combustion line 25. The combustion device 9 in the heating chamber 3 is set up for superstoichiometric operation, so that the combustion air for post combustion in the heating chamber is supplied to the atmosphere from the scrap chamber 2 by means of the combustion device 9. This is a structurally particularly simple solution to the provision of combustion air for post-combustion. However, the atmosphere in the heating chamber 3 could also be supplied with the combustion air required for post-combustion by means of an air line.

In other words, the combustion air line 25 of the combustion device 9 in the heating zone 3*a* of the melting chamber 3 is arranged to provide combustion air for post-combustion of the atmosphere from the scrap chamber 2 in the heating zone 3*a* in addition to the combustion air for the fuel, which is supplied to the combustion device by means of the fuel line 25.

A sensor 26 (FIG. 2) is arranged in the exhaust gas outlet 10 of the heating chamber 3 for measuring the oxygen content in the exhaust gas outlet 10 of the heating chamber 3. The oxygen content represents a characteristic value for the mixing ratio of the gas/air mixture in the heating chamber 3. Depending on the deviation of the measured oxygen content from a setpoint value, the control/regulation unit 14 generates a signal for supplying more or less fuel and/or combustion air to the combustion device 9.

From the measured characteristic value or from the signal in dependence on the deviation of the measured characteristic value from the setpoint value, a control variable for providing and/or stopping the provision of the air streams L in the melting chamber is further derived. Within the scope of the invention, a signal for generating the flame in the scrap chamber (2) could also be derived.

During post-combustion, the atmosphere from scrap chamber 2 is post-combusted in heating chamber 3 at a long residence time and high temperatures in a safe and environmentally friendly manner. The exhaust gases from heating chamber 3 finally pass from exhaust outlet 10 to a special exhaust gas cleaning process, in which the exhaust gas is cleaned of dust and harmful gas components.

After completion of the second pretreatment phase, the pretreated aluminum scrap batch 6 is pushed into the melt in the scrap chamber 2.

According to the invention, optimum pretreatment conditions are created in order to transfer organic adhesions as completely as possible into the gas phase. This leads to reduced dross formation and thus to an increased metal yield with simultaneous energy savings.

Following are the description of the labeled parts in the Figures.

1 Multi-chamber melting furnace
2 Scrap chamber
3 Heating chamber
3*a* Heating zone of the heating chamber
4 Wall
4*a*, 4*b* Wall
5 Loading door
6 Aluminum scrap
7 Hearth
8 Melt
9 Combustion device
10 Exhaust outlet
11 Partition wall
12 Opening
13*a*, 13*b* Air inlet
14 Control/regulation unit
15*a*, 15*b* Burner
15*a*' 15*b*' Burner
16*a*, 16*b* Circulation channel
17*a*, 17*b* Fan
18*a*, 18*b* Inlet opening
19*a*, 19*b* Outlet opening
20 Atmosphere outlet/connecting line
21 Blower
22*a*, 22*b* Fuel supply
23*a*, 22*b* Combustion air supply
24 Fuel line
25 Combustion air line
26 Sensor
λ Air number
L Air flow
N Melt level The embodiments described above are to be understood as examples. The features which are described together with other features, whether disclosed in the description, the claims, the figures or otherwise, also individually define essential elements of the invention.

Within the scope of the invention, variations are readily possible. For example, the multi-chamber melting furnace may have more than two chambers. Within the scope of the invention, only a single air inlet/burner combination or multiple air inlet/burner combinations may be provided.

Finally, it is noted that the term "comprising" does not exclude any component or element, that reference signs in the claims are not limiting, and that "a" or "one" includes a plurality.

The invention claimed is:

1. A method for recovering aluminum from an aluminum scrap having organic adhesions, in a multi-chamber melting furnace, at least with the following method steps:

providing the multi-chamber melting furnace comprising:
- a scrap chamber having a bottom arranged to contain a melt and a scrap chamber combustion device, wherein the scrap chamber has a hearth which can be loaded in batches with the aluminum scrap and is located above the bottom of the scrap chamber so as to be above the melt, and a loading door being arranged in a wall of the scrap chamber, the scrap chamber for a thermal pretreatment of the aluminum scrap and, during a first pretreatment phase, at a predetermined first temperature in an atmosphere that does not contain free oxygen, the organic adhesions on the aluminum scrap can be converted into a pyrolysis gas,
- an at least one heating chamber having a bottom in communication with the bottom of the scrap chamber which is arranged to contain a pool of the melt and which has at least one combustion device,
- an at least one air inlet in the wall of the scrap chamber for providing an at least one air flow into the scrap chamber during a second pretreatment phase at a predetermined second temperature, the scrap chamber being heatable to an auto-ignition temperature of the pyrolysis gas,
- a control/regulating unit which is connected to the at least one air inlet to provide the at least one air flow in the scrap chamber to form an ignitable substoichiometric mixture of the pyrolysis gas and/air in the scrap chamber, and
- an atmosphere outlet in the wall of the scrap chamber for discharging the atmosphere from the scrap chamber for a post-combustion, a batchwise loading of the hearth of the scrap chamber with the aluminum scrap, the thermal pretreatment of the aluminum scrap in the scrap chamber during the first pretreatment phase at the predetermined first temperature and in the atmosphere that does not contain free oxygen to convert the organic adhesions on the aluminum scrap into the pyrolysis gas, the thermal pretreatment of the aluminum scrap in the scrap chamber during the second pretreatment phase at the predetermined second temperature, wherein the scrap chamber is heated to the auto-ignition temperature of the pyrolysis gas, wherein the at least one air flow is provided in the scrap chamber to produce the ignitable substoichiometric mixture of the pyrolysis gas andair mixture, which is reacted in the scrap chamber, and transferring the atmosphere from the scrap chamber for the post-combustion.

2. The method according to claim 1, wherein during the second pretreatment phase the at least one air flow is provided to achieve the ignitable substoichiometric mixture of the pyrolysis gas and air mixture with an air number (λ) in the range of 0.3 to 0.6.

3. The method according to claim 1, wherein the melt recirculates between the heating chamber and the scrap chamber to heat the melt in the scrap chamber.

4. The method according to claim 1 wherein during the second pretreatment phase the following method step is additionally carried out:

when the temperature in the scrap chamber is lower than the auto-ignition temperature of the pyrolysis gas, generating an at least one flame in the scrap chamber by an at least one burner of the scrap chamber combustion device, the at least one burner having a fuel supply and a combustion air supply.

5. The method according to claim 1 wherein the atmosphere from the scrap chamber is transferred to the heating chamber for the post-combustion.

6. The method according to claim 1, wherein in the second pretreatment phase the at least one air flow is provided by directing the at least one air flow between the loading door and the aluminum scrap into the scrap chamber.

7. The method according to claim 4 wherein the at least one flame is generated adjacent to an air stream provided in the scrap chamber.

8. The method according to claim 4, wherein the at least one air flow in the scrap chamber is provided by means of the at least one burner, which is operated with an excess air when the temperature in the scrap chamber is lower than the auto-ignition temperature of the pyrolysis gas.

9. The method according to claim 1, wherein during the second pretreatment phase the at least one air flow is provided in such a way that the ignitable substoichiometric mixture of the pyrolysis gas and air mixture has an air number (λ) of about 0.5.

10. The method according to claim 5 wherein the combustion device in the heating chamber is operated with excess air.

11. The method according to claim 7, wherein the distance between the at least one flame and the air stream is chosen such that the at least one flame heats the air stream, and the at least one flame and the air stream are directed into the scrap chamber in the same manner.

12. The method according to claim 4, wherein the at least one air flow in the scrap chamber is provided by means of the at least one burner, the fuel supply to the at least one burner being interrupted and the combustion air supply to the at least one burner being reduced such that the ignitable substoichiometric mixture of the pyrolysis gas and air is generated in the scrap chamber when the temperature in the scrap chamber has reached or exceeds the auto-ignition temperature of the pyrolysis gas.

13. The method according to claim 1, wherein in the second pretreatment phase the at least one air flow comprises one air flow directed between the loading door and the aluminum scrap into the scrap chamber from each of opposite walls of the scrap chamber.

14. A multi-chamber melting furnace for recovering aluminum from an aluminum scrap having organic adhesions, comprising:

a scrap chamber having a bottom arranged to contain a melt and a scrap chamber combustion device, wherein the scrap chamber has a hearth which can be loaded in batches with the aluminum scrap and is located above the bottom of the scrap chamber so as to be above the melt, and a loading door being arranged in a wall of the scrap chamber, the scrap chamber for a thermal pretreatment of the aluminum scrap and, during a first pretreatment phase, at a predetermined first temperature in an atmosphere that does not contain free oxygen, the organic adhesions on the aluminum scrap can be converted into a pyrolysis gas, at least one heating chamber having a bottom in communication with the bottom of the scrap chamber which is arranged to contain a pool of the melt and which has at least one combustion device, at least one air inlet in the wall of the scrap chamber for providing at least one air flow into the scrap chamber during a second pretreatment phase at a predetermined second temperature, the scrap chamber being heatable to an auto-ignition temperature of the pyrolysis gas, a control/regulating unit which is connected to the at least one air inlet to provide the at least one air flow into the scrap chamber to form an ignitable substoichiometric mixture of the pyrolysis gas and air in the scrap chamber, and an atmosphere outlet in the wall of the scrap chamber for discharging the atmosphere from the scrap chamber for a post-combustion.

15. The multi-chamber melting furnace according to claim 14, wherein a partition wall is located between the scrap chamber and the heating chamber and the partition wall has at least one opening for recirculation of the melt between the heating chamber and the scrap chamber.

16. The multi-chamber melting furnace according to claim 14, wherein the scrap chamber combustion device comprises at least one burner having a fuel supply and a combustion air supply.

17. The multi-chamber melting furnace according to claim 16, wherein the at least one air inlet is an air lance.

18. The multi-chamber melting furnace according to claim 16 wherein the at least one burner forms the at least one air inlet and the control/regulating unit is connected to the at least one air inlet to provide the at least one burner with an excess air, when the temperature in the scrap chamber is lower than the auto-ignition temperature of the pyrolysis gas.

19. The multi-chamber melting furnace according to claim 14, wherein at least one circulating channel with an inlet opening and an outlet opening is connected to the scrap chamber in order to circulate the atmosphere inside the scrap chamber.

20. The multi-chamber melting furnace according to claim 19, wherein the outlet opening is located in the wall of the scrap chamber between the loading door and the hearth, the scrap chamber combustion device comprises at least one burner, and the at least one air inlet and the at least one burner are arranged within the outlet opening.

21. The multi-chamber melting furnace according to claim 14, wherein the atmosphere outlet is a connecting line between the scrap chamber and the heating chamber, in order to transfer the atmosphere from the scrap chamber to the heating chamber for a post-combustion.

22. The multi-chamber melting furnace according to claim 16 wherein the at least one burner forms the at least one air inlet and the control/regulating unit is connected to the at least one air inlet to interrupt the fuel supply to the at least one burner and to reduce the combustion air supply to the at least one burner when the temperature in the scrap chamber has reached or exceeds the auto-ignition temperature of the pyrolysis gas.

23. The multi-chamber melting furnace according to claim 16, wherein the at least one burner is arranged next to the at least one air inlet.

24. The multi-chamber melting furnace according to claim 19, wherein the scrap chamber combustion device comprises at least one burner configured to discharge into the scrap chamber at an outlet velocity of between 60 m/s and 130 m/s, and the at least one air inlet is configured to discharge an air stream into the scrap chamber at an outlet velocity of between 30 m/s and 60 m/s.

* * * * *